United States Patent

Schnurbusch et al.

[11] 3,952,040
[45] Apr. 20, 1976

[54] UREA DERIVATIVE CONTAINING ISOCYANATE GROUPS

[75] Inventors: Horst Schnurbusch, Herne; Peter Kirchner, Wanne-Eickel, both of Germany

[73] Assignee: Veba-Chemie AG, Gelsenkirchen-Buer, Germany

[22] Filed: Aug. 5, 1974

[21] Appl. No.: 494,959

[30] Foreign Application Priority Data
Aug. 14, 1973 Germany............................ 2341065

[52] U.S. Cl...................... 260/453 A; 260/75 NT; 260/77.5 AT; 260/453 P
[51] Int. Cl.².................................. C07C 119/045
[58] Field of Search .................... 260/453 A, 453 P

[56] References Cited
UNITED STATES PATENTS
2,757,184   7/1956   Pelley ................................ 260/453

Primary Examiner—Lewis Gotts
Assistant Examiner—Dolph H. Torrence
Attorney, Agent, or Firm—Burgess, Dinklage & Sprung

[57] ABSTRACT

Urea derivative containing isocyanate groups having the formula

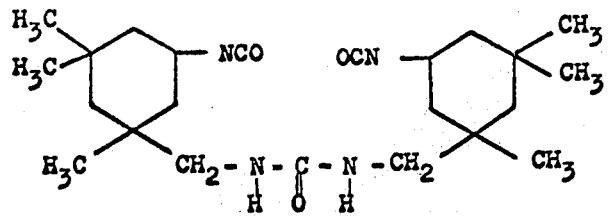

This urea derivative is prepared by reacting 3-isocyanatomethyl-3,5,5-trimethylcyclohexylisocyanate with water in a molar ratio of 2:1 at temperatures in the range of 0°–100°C in the presence of a catalyst with stirring in a solvent for the urea derivative.

3 Claims, No Drawings

UREA DERIVATIVE CONTAINING ISOCYANATE GROUPS

BACKGROUND

This invention relates to certain urea derivatives containing isocyanate groups and to a method for their production.

(IPDI) under stirring with water in a molrar ratio of 2:1 in the presence of catalysts at temperatures of 0° – 100°C, preferably 20° – 50°C, in a solvent for the starting material and the urea derivative formed. A carbamide acid derivative is first formed which then reacts with further diisocyanate to form the urea derivative, as shown by the following reaction scheme:

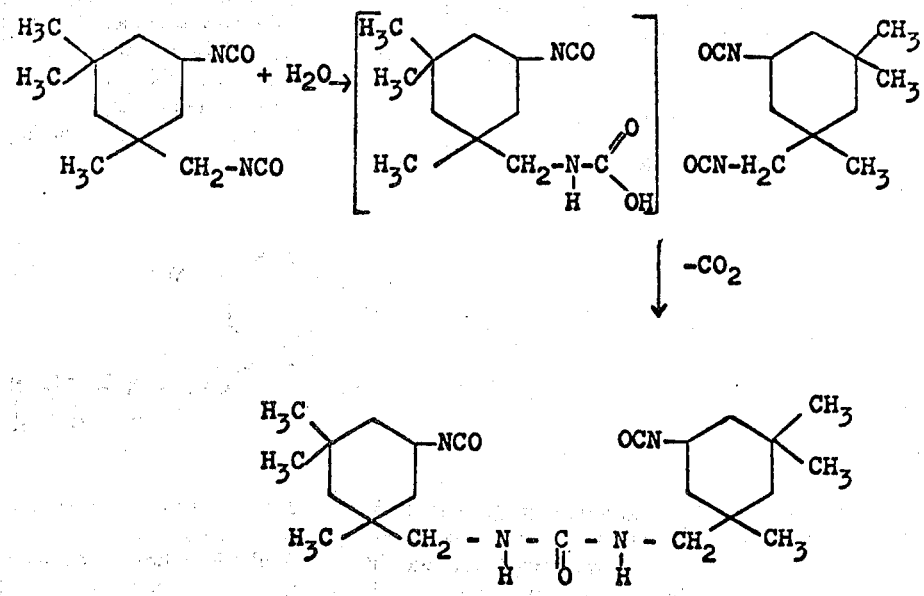

The reaction of 3-isocyanatomethyl-3,5,5-trimethylcyclohexylisocyanate (also known as isophorone diisocyanate or IPDI) with diamine in the molar ratio of 2:1 forms a compound which is insoluble in the usual solvents. The compound that forms is probably a urea adduct built of at least 3 molecule units. The question of solubility, however, is of great importance for the use of this reaction product as a cross-linking agent for polyesters and polyethers containing hydroxyl groups. A strong viscosity increase of the cross-linking system results from the insolubility of the adduct and the inhomogeneity conditioned thereby complicates processing considerably.

SUMMARY

It has now been found that many previous disadvantages are avoided by a urea derivative containing isocyanate groups which has the formula

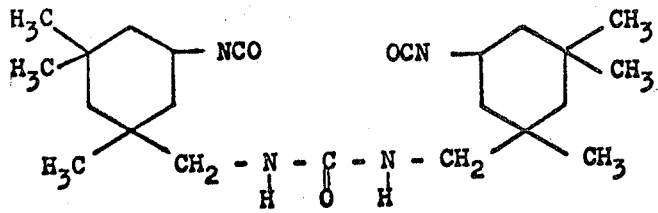

DESCRIPTION

This derivative can be made by the partial reaction of diisocyanate with water and is soluble in excess diisocyanate and several polyurethane solvents. No undesirable viscosity increase is observed when this urea derivative is mixed with a polyol component.

The adduct of the invention is made by reacting 3-isocyanatomethyl-3,5,5-trimethylcyclohexylisocyanate The selectivity of the reaction mechanism is favored by the fact that IPDI has two different active isocyanate groups in the molecule. It is known that the aliphatic isocyanate group in IPDI is more reactive than the cycloaliphatic isocyanate group. The process of using isophorone diisocyanate as the starting material thus has special advantages.

Suitable solvents for the reaction are those in which the starting material and the reaction product are soluble. Furthermore, these solvents should not contain residues or groups reacting with isocyanate groups. Examples of suitable solvents are ketones, as methylethylketone, methylisobutylketone, diisobutylketone and others, and esters, like ethylacetate, n-propylacetate, i-propylacetate, n-butylacetate and others. Very suitable as solvent for the reaction is an excess of IPDI.

For the production of the urea derivative of the invention it is advisable to add catalysts. Suitable catalysts are organometalic compounds of certain polyvalent metals, as for example tin, lead, mercury, iron, zinc and manganese. Examples of catalysts are mercury acetate, phenyl mercury acetate, phenyl mercury propionate, di-n-butyltindilaurate, lead-(II)-octoate, tin-(II)-octoato, zincoctoate, phenyl mercury naphthenate, ironacetylacetonate, manganese acetylacetonate. The invention will be illustrated by the following examples.

EXAMPLE 1

In a reaction vessel 2 moles IPDI (444 g) were mixed with 0.05 wt.% (0.222 g) di-n-butyltindilaurate (DBTL) and proportionately diluted under intensive stirring with 0.5 mole water (9.0 g). At a temperature of 25°C the reaction started after about 45 minutes splitting off $CO_2$ and developing heat. After a further stirring of 3 hours the reaction was finished. The reaction product had a NCO-equivalent weight of about 140 and a viscosity of about 2500 cP (determined at 25°C).

EXAMPLE 2

In a reaction vessel 2 moles (444 g) IPDI, 1 moles (18 g) water, 224 g methylisobutylketone and 0.05 wt.% (0.2 g) di-n-butyltindilaurate were mixed under intensive stirring at room temperature. The reaction started after about 45 minutes splitting off $CO_2$ and developing heat whereby the temperature rose up to 50°C. After further stirring of 5 hours the reaction was finished (no further $CO_2$ - formation). The reaction product was a clear, colorless solution with a solid content of 65 wt.%, a NCO-equivalent weight of 330 and a viscosity of about 3500 cP (measured at 25°C).

EXAMPLE 3

Example 2 was repeated using diisobutylketone instead of methylisobutylketone. The clear, colorless solution has a NCO-equivalent weight of 317 and a viscosity of about 10,000 cP (measured at 25°C).

EXAMPLE 4

Example 2 was repeated using ethylglykolacetate instead of methylisobutylketone. The clear, colorless solution had a NCO-equivalent weight of 334 and a viscosity of 10,000 cP (measured at 25°C).

EXAMPLE 5

Example 2 was repeated using instead of methylisobutylketone. The clear, colorless solution had a NCO-equivalent weight of 320 and a viscosity of about 5,000 cP (measured at 25°C).

What is claimed is:

1. Urea derivative containing isocyanate groups having the formula

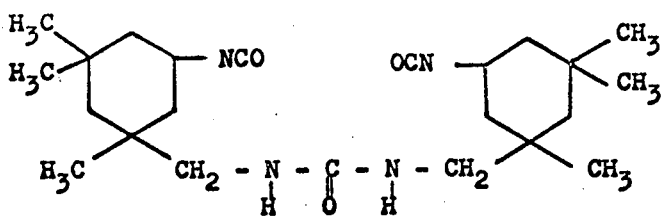

2. Method for making the urea derivative of claim 1, which comprises reacting 3-isocyanatomethyl-3,5,5-trimethylcyclohexylisocyanate with water in a molar ratio of 2:1 at temperatures of 0° – 100°C, preferably 20° – 50°C, in presence of a catalyst with stirring in a solvent for the urea derivative, said catalyst being a polyvalent organometalic compound selected from the group of mercury acetate, phenyl mercury acetate, phenyl mercury propionate, di-n-butyltindilaurate, led-(II)-octoate, tin-(II)-octoate, zinc octoate, phenyl mercury naphthenate, ironacetylacetonate and manganese acetylacetonate.

3. Method of claim 2 wherein said solvent is selected from the group of ketones, esters and excess 3-isocyanatomethyl-3,5,5-trimethylcyclohexylisocyanate.

* * * * *